United States Patent [19]

Mori

[11] 4,157,699
[45] Jun. 12, 1979

[54] METHOD AND APPARATUS FOR CONTROLLING SPARK TIMING OF INTERNAL COMBUSTION ENGINE

[75] Inventor: Yasunori Mori, Katsuta, Japan

[73] Assignee: Hitachi, Ltd., Tokyo, Japan

[21] Appl. No.: 877,702

[22] Filed: Feb. 14, 1978

[30] Foreign Application Priority Data

Feb. 25, 1977 [JP] Japan .................................. 52-19205

[51] Int. Cl.² ............................................. F02P 5/04
[52] U.S. Cl. ............................ 123/117 D; 123/117 R; 123/32 EB; 123/32 ED; 123/32 EJ; 123/32 EG; 364/431
[58] Field of Search .......... 123/117 D, 117 R, 32 EB, 123/32 EC, 32 ED, 32 EG, 32 EJ, 32 EA; 364/424, 431, 442

[56] References Cited

U.S. PATENT DOCUMENTS

| 3,969,614 | 7/1976 | Moyer et al. | 123/117 D |
|---|---|---|---|
| 3,978,833 | 9/1976 | Crall et al. | 123/117 R |
| 3,991,727 | 11/1976 | Kawai et al. | 123/32 EA |
| 4,009,699 | 3/1977 | Hetzler et al. | 123/117 D |
| 4,015,565 | 4/1977 | Aono et al. | 123/117 D |
| 4,060,714 | 11/1977 | Lappington et al. | 123/117 D |
| 4,098,243 | 7/1978 | Yoshida et al. | 123/117 D |

Primary Examiner—Charles J. Myhre
Assistant Examiner—Andrew M. Dolinar
Attorney, Agent, or Firm—Craig and Antonelli

[57] ABSTRACT

Method and apparatus for controlling the spark timing of an internal combustion engine is provided, wherein the output of a sensor for detecting the state of a means affecting the engine operation is detected prior to engine start, and the detected value is stored as an initial value. After engine start, the output of the sensor for detecting the state of the means affecting the engine operation is again detected, and this detected value is corrected by the stored initial value. On the basis of the corrected detected value, a command value of ignition point in time (command ignition timing) is calculated and used to control ignition timing.

10 Claims, 8 Drawing Figures

METHOD AND APPARATUS FOR CONTROLLING SPARK TIMING OF INTERNAL COMBUSTION ENGINE

LIST OF PRIOR ART REFERENCES (37 CFR 1.56(a))

The following references are cited to show the state of the art:
(1) Article entitled "GM Lays the Cornerstone with MISAR", AUTOMOTIVE INDUSTRIES, Nov. 1, 1976, Pages 29 to 32.
(2) Article entitled "Microprocessor Design", Electronic Design 19, Sept. 13, 1976, Pages 53 to 56.

BACKGROUND OF THE INVENTION

This invention relates to an electronic spark timing advancing apparatus for controlling the ignition timing of an internal combustion engine, or more in particular to an electronic spark timing advancing apparatus using a microprocessor chip for calculating ignition timing.

Typical example of conventional electronic spark timing advancing apparatuses of this type is disclosed in an article entitled "GM Lays the Cornerstone with MISAR", AUTOMOTIVE INDUSTRIES, Nov. 1, 1976, Pages 29 to 32, in which the microprocessor chip takes informations of crankshaft position, engine speed, coolant temperature and intake manifold vacuum measured by several sensors and calculate the optimum spark advance of the conditions encountered referring to the programmed memory. Other apparatuses of such type in use include a mere wired logic system and an analog system. For detecting the engine load conditions, these systems use a throttle sensor for detecting the opening degree (angle) of a throttle valve, an intake manifold vacuum sensor for detecting the vacuum of the intake manifold, or an air flowmeter for detecting the flow rate of air flowing into the carburetor from the air cleaner. In these sensors, zero adjustment is accomplished by adjusting the mechanical position of the indicator of the sensor which is interlinked with, for instance, the throttle valve. In view of difficulty of precisely adjusting the mechanical position of the indicator of the sensor, complete zero adjustment of the indicator of the sensor is impossible and an error of the output of the sensor is unavoidable.

As a sensor for detecting the opening degree of the throttle valve, for instance, assume a potentiometer with an indicator (slider) interlinked with the throttle valve, in which the opening degree of the throttle valve is indicated by the output voltage (electric potential of the slider) of the potentiometer. The slider position at which the opening degree of the throttle valve is zero (this slider position is hereinafter referred as an actual zero position) is required to be adjusted in such a manner that the output voltage of the sensor is at a predetermined value, for instance, zero. The slider position under this condition is hereinafter referred as an expected zero position. This zero adjustment is so difficult and low in accuracy that an output voltage of the sensor contains error which cannot be neglected in calculating the ignition timing. Even if the zero adjustment is accomplished very accurately, the actual zero position of the slider develops an error and is displaced from the expected zero position slowly with time, with the result that the output voltage of the sensor comes to fail to represent an accurate opening degree of the throttle valve. An electronic spark timing advancing apparatus for advancing the spark timing on the basis of the output value of the sensor, therefore, is incapable of optimum control. Further, the zero adjustment of the sensor is troublesome, and in addition difficult to improve the accuracy thereof.

SUMMARY OF THE INVENTION

Accordingly, it is an object of the present invention to obviate the above-mentioned disadvantages of the conventional electronic ignition timing advancing apparatuses.

According to the present invention, the amount of offset or displacement of the slider of the sensor for detecting the state of the means affecting the engine operation from the expected zero position thereof is measured by detecting the output value of the sensor prior to engine start, for instance, at the time of power being thrown in and the offset amount is stored. After engine start, the output value of the sensor during engine operation is measured and the measured output value of the sensor is corrected by the offset amount thereby detecting the correct engine load state, and an optimum ignition timing is calculated on the basis of the corrected value.

DESCRIPTION OF THE PREFERRED EMBODIMENT

Figure 1:
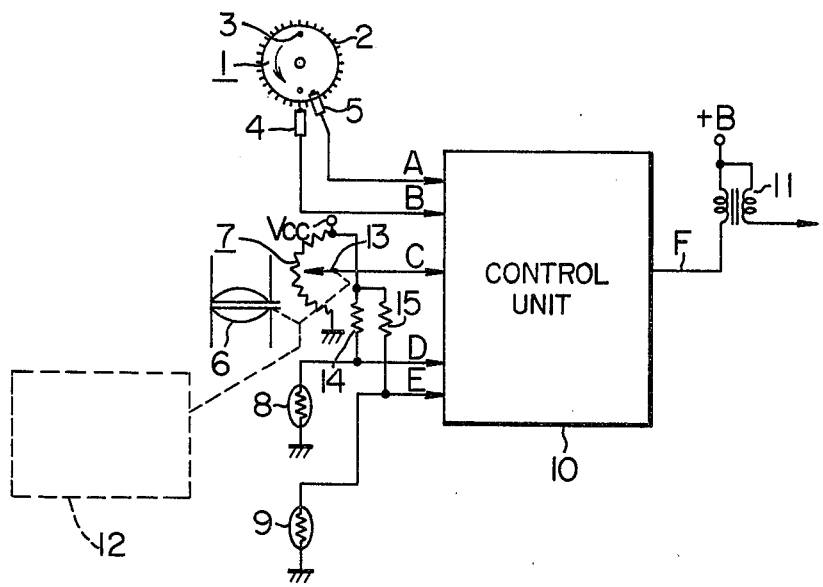
FIG. 1 is a schematic diagram showing an embodiment of an electronic ignition timing advancing apparatus according to the present invention.
Figure 3:
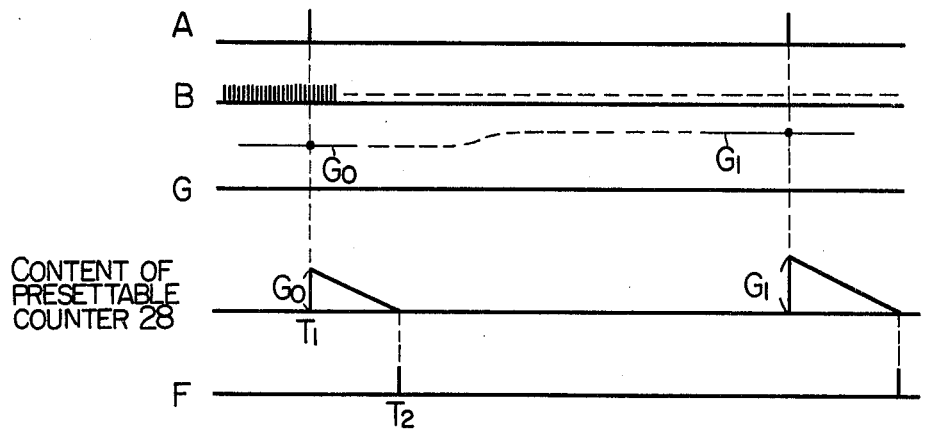
FIG. 3 is a time chart showing signals produced at various parts of the control unit of an embodiment of the electronic ignition timing advancing apparatus according to the present invention.

A schematic diagram of a typical embodiment of the electronic ignition timing advancing apparatus according to the present invention is shown in FIG. 1. Illustratively, it is used with a two-cycle four-cylinder engine. A disc 1 mounted on a crankshaft (not shown) of one the four engine includes a plurality of protrusions 2 formed at interval of a pregiven degree, for instance, one degree and two protrusions 3 formed at interval of 180°. A pickup 4 detects the protrusions 2 and produces a pulse as an angular signal B for each detection of the protrusion 2, i.e. for each rotation of 1° of the crankshaft, while a pickup 5 is for detecting the protrusions 3 to produce a pulse as a reference signal A for each rotation of 180° of crankshaft. The reference signal A and angular signal B are shown in the time chart of FIG. 3, in which the abscissa represents time so that the crank angle is determined from the number of the angular signals B. The reference signal A corresponds to the angular position of the crankshaft at the time when the piston of the associated engine has reached the top dead center, but the pickup 5 may be arranged at appropriate position and the top dead center does not necessarily need not coincide with the crank angular position at which the reference signal is produced. The angular signal B is produced for each 1° rotation of the crankshaft after production of the reference signal A. Outputs of the pickups 4 and 5 are applied to a control unit 10. As a device for detecting the engine load conditions a throttle sensor for detecting the opening degree of the throttle valve 6 is used. The throttle sensor may be a potentiometer 7 associated with the throttle valve. The potentiometer 7, which is connected with a DC power supply Vcc, has a slider 13 operatively interlinked with the throttle valve 6. The voltage of the slider 13 is applied to the control unit 10 as a load signal C in the form of an analog voltage signal proportional to the opening degree of the throttle valve. As another device 12 for detecting the engine load conditions, the throttle sensor may be replaced by an intake manifold vacuum sensor for detecting the vacuum of the intake manifold or an air flowmeter for detecting the amount of air in-flow to the intake manifold. Further, as a device for detecting the temperature of the engine cooling water, a thermistor 8 provided in the water jacket is used. The thermistor 8 is connected through a resistor 14 to the power supply Vcc and applies to the control unit 10 an analog voltage as a cooling water temperature signal D corresponding to the temperature of the cooling water. As a device for detecting the temperature of suction air of the engine, a thermistor 9 provided at an inlet of the air filter or like position is used. The thermistor 9 is connected via a resistor 15 to the DC power supply Vcc and applies to the control unit 10 an analog voltage as a suction air temperature signal E corresponding to the suction air temperature. In response to these signals, the control unit 10 calculates an optimum ignition timing and, at such an optimum ignition timing, applies an ignition signal F to the ignition coil 11. The ignition coil 11 is energized by the ignition signal F, and applies a high voltage output to a corresponding ignition plug through a distributor not shown. Another signal such as an exhaust gas temperature signal other than the cooling water temperature signal D and the suction air temperature signal E may be applied to the control unit 10.

Figure 2:
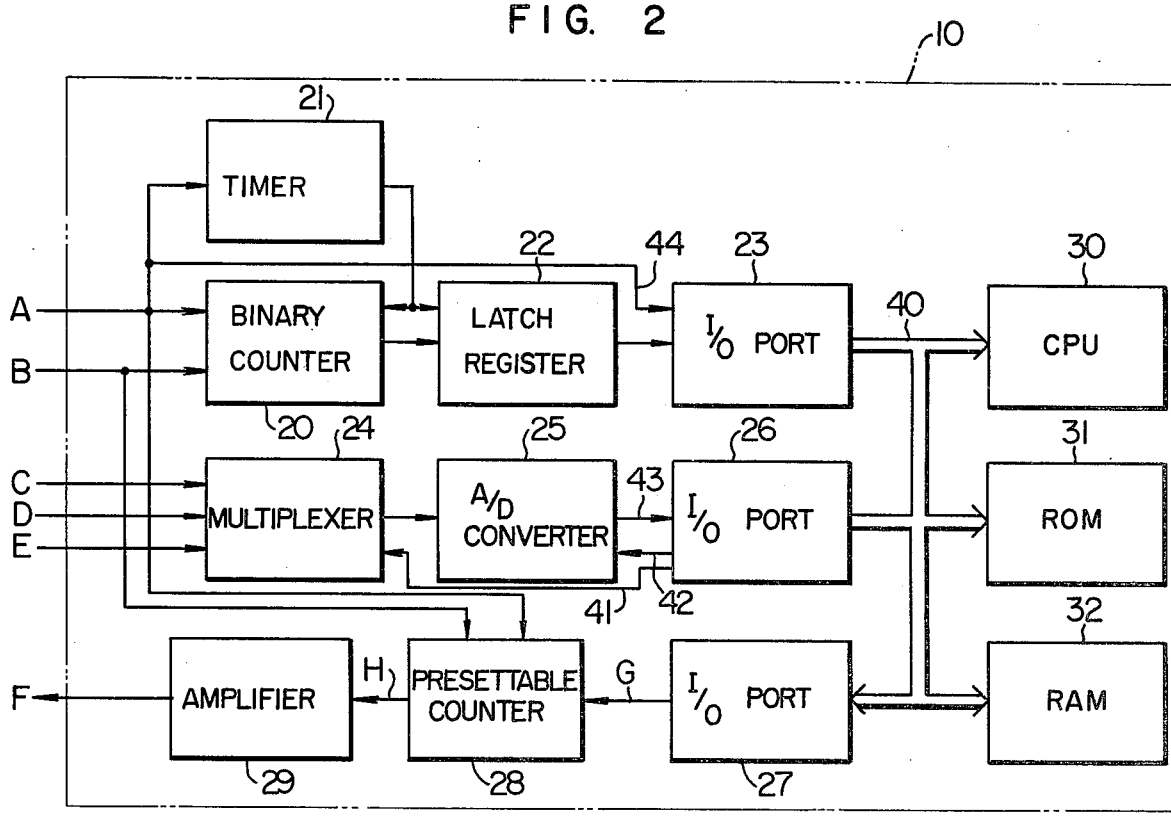
FIG. 2 is a block circuit diagram showing a typical example of the control unit of an embodiment of the electronic ignition timing advancing apparatus according to the present invention.

A block circuit diagram showing a typical example of the control unit 10 is illustrated in FIG. FIG. 2. The reference signal A from the pickup 5 and the angular signal B from the pickup 4 are applied to a binary counter 20. The binary counter 20 counts the number of the angular signals B, and the content thereof is supplied to a latch register 22 as a binary signal, for instance, 8-bit digital signal. A timer 21 is actuated, it applies an output signal thereof to the counter 20 and the latch register 22 for each lapse of a predetermined length of time. In response to the output signal, the counter 20 is reset, while the latch register 22 is set thereby to receive the content in the counter 20 stored immediately before the resetting thereof. Thus, the counter 20 is reset for each interval of the predetermined time length determined by the timer 21, and during each of such intervals the counter 20 counts the number of the angular signals B generated thereby detecting the rotational angle of the crankshaft during the predetermined length of time. Thus the content of the resistor 21 indicates an engine rotational speed. The content of the counter 20 received by the latch register 22 is applied to an input terminal of an I/O portion 23 in the form of speed information. When a read command is issued from a microprocessor (hereinafter referred to only as CPU) 30 to the I/O port 23 through a bus 40, the speed information is supplied from the input terminal of the I/O port to and read by the CPU 30. CPU 30, in cooperation with a RAM 32, controls the operation of the control unit 10 in accordance with a pregiven program stored in a MASK ROM 31. CPU 30 may assume the form of Motorola Inc.,'s MC-6800 or MC-6802, and RAM 32 Motorola Inc.,'s MCM-6810.

The throttle opening signal C from the potentiometer 7, the cooling water temperature signal D from the thermistor 8, and the suction air temperature signal E from the thermistor 9 are applied to a multiplexer 24. The multiplexer 24, in response to an address signal supplied from the CPU 30 through the bus 40, an I/O port 26 and a control line 41, selectively passes one of the throttle opening signal C, the cooling water temperature signal D and the suction air temperature signal E to an analog-digital converter (hereinafter referred as an A/D converter) 25. In response to an actuating signal applied from CPU 30 through the bus 40, the I/O port 26 and a control line 42, the A/D converter 25 start analog digital convertion of each input analog signal into a binary signal such as an 8-bit digital signal. The converted signals of the throttle opening signal C, the cooling water temperature signal D and the suction air temperature signal E are respectively applied to the I/O port 26 as speed information, cooling water temperature information, suction air temperature information or throttle opening information. The binary signal applied to the I/O port 26 is read by the CPU 30. Using the speed information, throttle opening information, cooling water temperature information and suction air temperature information thus read, CPU 30 executes the program stored in RAM 31 and calculates a command value of the ignition timing in the form of a binary signal in accordance with the program. This calculated command value, taking the form of a binary signal is applied through the bus 40 to an I/O port 27 as an ignition timing signal G. The command value of ignition timing is associated with a crank angle where ignition is desired and represents the number of angular signals B or rotational angle of the crankshaft during the period from generation of reference signal A to generation of ignition signal F. The ignition timing signal G representing the command value is supplied to a presettable counter 28. The operation of the presettable counter 28 will be explained below with reference to the time chart of FIG. 3, in which the abscissa represents time and the ordinate voltage. The presettable counter 28 is adapted to receive the reference signal A and the angular signal B. At time point $T_1$ when the reference signal A is applied, the counter 28 sets the binary value $G_O$ of the ignition timing signal G, and subsequently, each time of receipt of the angular signal B, subtracts the binary value $G_0$ by one. At the time point when the value $G_0$ becomes zero, namely, at time point $T_2$, a signal H is produced and applied to an amplifier 29. The signal H, after being amplified by the amplifier 29, is applied as the ignition signal F to the ignition coil 11, thereby causing a spark in a corresponding ignition plug (not shown) through the distributor. In other words, when the number of the angular signals B applied after the application of the reference signal A reaches the binary value of the ignition timing signal G, that is, when the crankshaft rotates a predetermined angle decided by the binary value of the signal G, the ignition signal F is generated. As a result, the ignition signal F is generated at the desired ignition timing set by the CPU 30.

Figure 4:
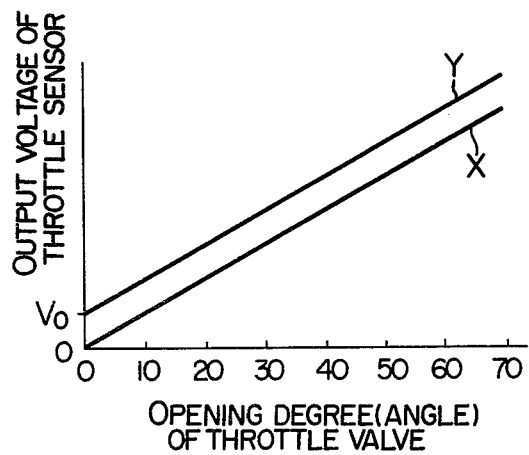
FIG. 4 is a diagram showing the characteristics of the sensor for detecting the engine load conditions.

A graph of output characteristics of the throttle sensor 7 is shown in FIG. 4, in which the abscissa represents the opening degree of the throttle valve and the ordinate the output voltage of the throttle sensor.

The characteristic X shows a desirable characteristic of the throttle sensor, in which the output voltage is zero when the throttle opening degree is zero and increases along a straight line with the increase in the degree of the throttle opening. Actually, however, the throttle sensor has unavoidably an offset voltage of a voltage $V_0$ at zero throttle opening degree, as shown by the characteristic Y. This is attributable to the fact that in the case of the throttle sensor 7 of potentio type as shown in FIG. 1, it is difficult to precisely adjust it in such a manner that the output voltage thereof is zero at zero opening degree of the throttle valve 6. According to the embodiment under consideration, the characteristic Y is moved parallelly and automatically by the value equivalent to the offset voltage $V_0$ toward the characteristic X in order to reduce the offset voltage to zero. In other words, the present embodiment is such that when power for the electronic spark timing advancing apparatus is thrown in, i.e., when the automobile engine key switch is turned on before engine start, for instance, the opening degree of the throttle valve 6 is immediately detected by the throttle sensor 7, so that the detected voltage, namely, $V_0$ is read by the control unit 10 and stored as an initial value in the RAM 32. After starting the engine, the ignition timing thereof is controlled by the output signal F. In producing the output signal F, the initial value stored in the RAM 32, i.e., the offset voltage $V_0$ of the throttle sensor is subtracted from the throttle opening signal C which is detected during the engine driving, thus causing the apparent characteristic of throttle sensor 7 to coincide with the characteristic X of FIG. 4. In this way, the CPU 30 subtracts the initial value stored in the RAM 32 from the throttle opening signal C detected after engine start, and calculates a command value of ignition timing on the basis of the result of the subtraction.

Figure 5:
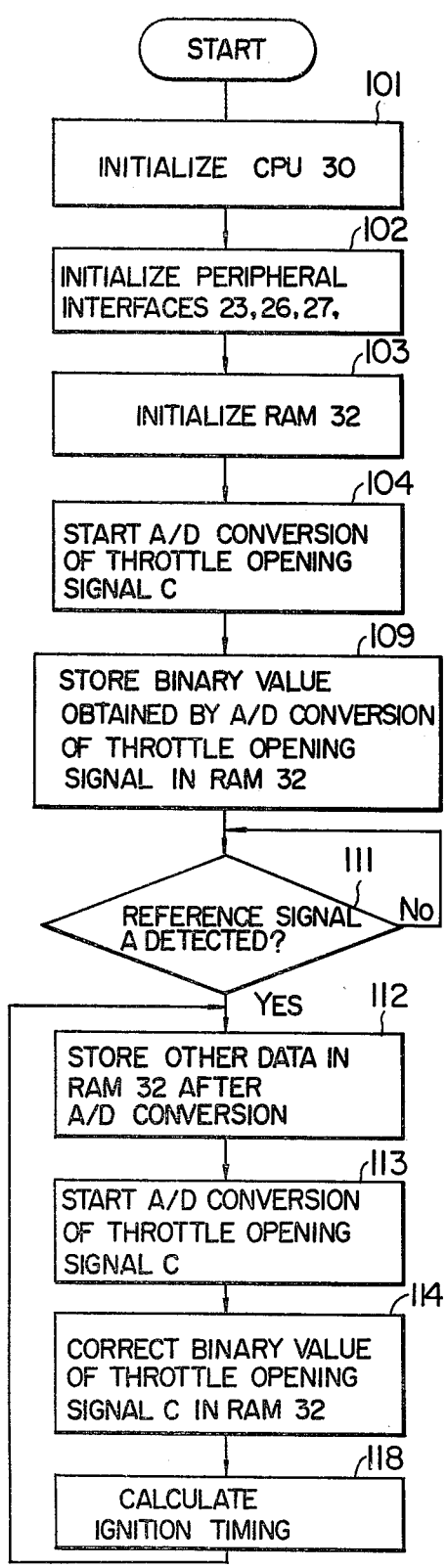

An example of a flow diagram showing the sequence of calculation of the command value of ignition timing which is to be calculated by the CPU 30 in accordance with the program stored in the ROM 31 is illustrated in FIG. 5. First, in step 101, the power supply for the electronic spark timing advancing apparatus is thrown in response to which the CPU 30 is initialized or reset. In step 102 the initialization of peripheral interfaces including the I/O ports 23, 26 and 27 is effected and in step 103, the RAM 32 is initialized. The steps (101, 102, 103) may be changed in order. In step 104, the throttle opening signal C is applied through the multiplexer 24 to the A/D converter 25 and converted thereby into a binary signal whose value corresponds to the analog value of the throttle opening signal C. In step 109, the binary value of the throttle opening signal C obtained in the step 104 is stored in the RAM 32. Next, at step 111, it is decided whether or not the reference signal A is supplied through a line 44 to the I/O port 23, i.e., whether or not the engine is started. In the presence of reference signal A, operation is proceeded to the next step, while in the absence of reference signal A, step 111 is repeated. Step 112 is for causing the CPU 30 to read the information stored in the latch register 22 through the I/O port 23, so that the read value is stored at a predetermined address in the RAM 32. Each of the cooling water temperature signal D and the suction air temperature signal E is applied through the multiplexer 24 to the A/D converter 25 and converted into a binary signal thereby. The binary value of each of the signals D and E is stored at a predetermined address in the RAM 32. In other words, upon application of a multiplexer control signal from the CPU 30 through the bus 40 to the I/O port 26, the I/O port 26 applies through the control line 41 an address signal associated with the cooling water temperature signal D to the multiplexer 24, whereby the multiplexer passes the cooling water temperature signal D to the A/D converter 25. An actuating signal is then applied through the control line 42 to the A/D converter 25 to actuate it thereby to effect A/D conversion of the cooling water temperature signal D. Upon completion of A/D conversion, the converted binary value of the cooling water temperature signal D is fetched in the accumulator of the CPU 30 through the I/O port 26, and then this binary value is stored in the predetermined address in the RAM 32. After the completion of the storage of the binary value of the cooling water temperature signal D in the RAM 32, the suction air temperature signal E is then converted into a binary signal by the same manner as in the case of the cooling water temperature signal D, so that the binary value of the suction air temperature signal E thus converted is stored in the RAM 32. Incidentally, the speed information, cooling water temperature information, and suction air temperature information may be obtained in any desired sequence.

The same process as in step 104 is performed in step 113 where the throttle opening signal C in driving operation of engine is converted into a binary signal thereby to produce a binary value of the throttle opening signal. At step 114, the binary value of the throttle opening signal C stored in the RAM 32 at step 109 is subtracted from the binary value of the throttle opening signal obtained at step 113, thus producing a corrected value of the throttle opening degree. At step 118, the CPU 30 receives the speed information, the cooling water temperature information and the suction air temperature information stored to the RAM 32. On the basis of these informations and the corrected binary value of the throttle opening signal C stored in the accumulator, the CPU 30 calculates the command value of ignition timing, and the calculated result is applied as the ignition timing signal G to the presettable counter 28 through the bus 40 and the I/O interface 27. Upon completion of step 118, steps 112 to 118 are repeated until the engine stops.

Figure 6:
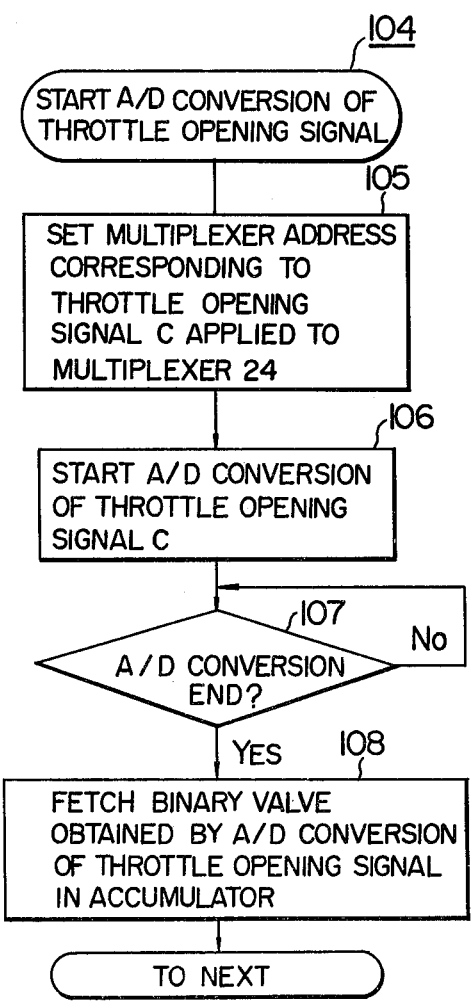
FIGS. 5 to 8 are flow diagrams the sequence in which ignition timing is calculated by the control unit of an embodiment of the electronic ignition timing advancing apparatus according to the invention.
Figure 7:
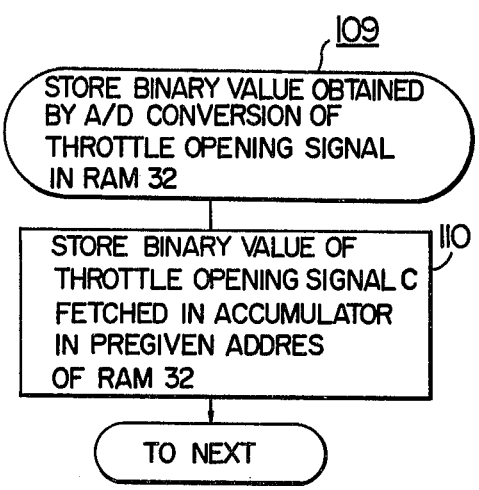
Figure 8:
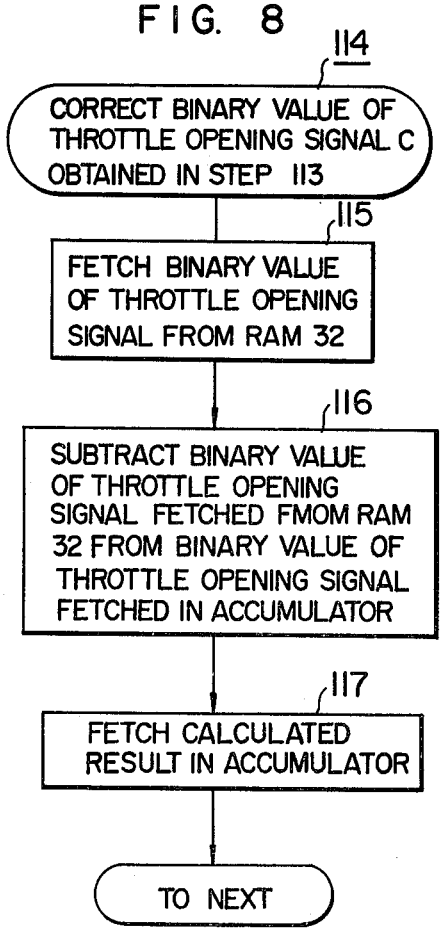

Steps 104, 109 and 114 will be explained below more in detail. At step 104, the throttle opening signal C is converted into a binary signal in the sequence as its detail is shown in FIG. 6. First at step 105, the CPU 30 sets an address of the multiplexer 24 associated with the throttle opening signal C applied to the multiplexer 24 and applies a signal for designating that address through bus 40, I/O port 26 and control line 41 to the multiplexer 24, thereby passing the throttle opening signal C to the A/D converter 25. At step 106, the CPU 30 applies an actuating signal to the A/D converter 25 through the bus 40, I/O port 26 and control line 42, so that the A/D converter 25 is actuated to start converting the throttle opening signal C into a binary signal. At step 107, it is detected whether or not the A/D converter 25 has completed the A/D conversion. If it is completed, operation is proceeded to step 108, while if it is not completed, on the other hand, step 107 is repeated. At step 108, the converted binary value of the throttle opening signal is fetched or loaded as an initial value to the accumulator of the CPU 30 through the I/O port 26. This is followed by step 109 in FIG. 5, where the binary value fetched to the accumulator is stored in the RAM 32. The step 109 includes step 110 as shown in FIG. 7. At step 110, the binary value of the throttle opening signal fetched to the accumulator is stored at a predetermined address in RAM 32. The step 114 in FIG. 5 comprises steps 115, 116 and 117 shown in FIG. 7. At step 115, the converted binary value of the throttle opening signal (initial value) is received from the RAM 32 to the accumulator; at step 116 the initial value is subtracted from the binary value of the throttle opening signal fetched to the accumulator in step 113; and at step 117, the result of the subtraction is obtained in the accumulator.

By the way, step 112 may be performed after step 114.

As seen from the foregoing description, according to the embodiment under consideration, a binary value of the throttle opening signal before engine start (initial value) is detected. After the engine is started, the initial value is subtracted from the detected throttle opening signal after engine start thereby to determine a correct value of throttle opening degree. The value thus obtained is used to calculate an optimum ignition timing. In this way, any offset of the throttle sensor is eliminated, and thus improper calculation of the ignition timing which otherwise would occur due to the offset is prevented. Accordingly, adjustment is not required to ensure that the output voltage of the throttle sensor, i.e. the potentiometer 7 is a pregiven value, for instance zero when opening degree of the throttle valve 6 is zero, in other word zero adjustment of the sensor is not required. Further, even if the mechanical position of the slider 13 of the potentiometer 7, i.e. actual zero position, is displaced with time from the expected zero position, it is not required to restore the position of the slider to the expected zero position for correct detection of the throttle opening degree.

Although the above-mentioned embodiment includes the throttle sensor 7 as a means for detecting the engine load condition, the present invention is not limited to such a sensor but may use, for detection of the engine load condition, a manifold vacuum sensor for detecting the vacuum in the intake manifold or an air flowmeter for detecting the amount of air flowing into the carbureter. Further, instead of reducing the offset to zero by subtracting the initial value from the binary value of the detected throttle opening signal as in the above-mentioned embodiment, a value less than the offset may be subtracted so that the output voltage of the throttle sensor is not zero when the throttle valve opening degree is zero. Furthermore, the time of throwing in a power supply of the apparatus according to the invention is not necessarily the time of turning on the engine key but may alternatively be the time when the driver is seated, or other such time as enables detection of the sensor condition prior to engine start.

It will be understood from the foregoing description that according to the present invention, the initial value (offset value) of the analog input sensor for detecting the engine load conditions is automatically adjusted for optimum ignition timing control, and therefore the labor of adjustment on sensor side is eliminated on one hand and an improper ignition timing advancing control attributable to an erroneous adjustment is eliminated on the other hand.

I claim:

1. A method for controlling the ignition timing of an internal combustion engine including an ignition device, comprising the steps of:
   detecting, prior to engine start, the output of a sensor for detecting the state of means affecting engine operation, and storing the detected value as an initial value;
   detecting, after engine start, the output of said sensor for detecting the state of said means affecting engine operation, and correcting the detected value by said initial value stored;
   calculating a command value of ignition timing on the basis of said corrected detected value; and
   controlling the ignition timing according to said command value.

2. A method according to claim 1, further comprising a step of detecting the engine rotational speed, the temperature of cooling water in a water jacket and the temperature of suction air of a carbureter, said command value of ignition timing being calculated on the basis of said corrected detected value, said detected engine speed, said detected temperature of cooling water, and said detected temperature of suction air.

3. A method according to claim 1, wherein, after engine start, said step of detecting the output of said sensor for detecting the state of said means affecting engine operation, and correcting the detected value by said initial value stored, said step of calculating a command value of ignition timing on the basis of said corrected value, and said step of controlling the ignition timing according to said command value, are repeated.

4. A method according to claim 1, in which the correction of the detected value of said sensor for detecting, after engine start, the state of said means affecting engine operation is effected by subtracting said stored initial value from said detected value obtained after engine start.

5. A method according to claim 1, in which said state of said means affecting engine operation is the opening degree of a throttle valve.

6. An electronic ignition timing advancing apparatus for controlling the ignition timing of an internal combustion engine including an ignition device, comprising:
   a first sensor for detecting the state of means affecting engine operation;
   memory means for storing the value detected by said sensor; and
   a microprocessor for controlling the ignition timing of said ignition device on the basis of the detected value of said sensor, said microprocessor reading the detected value of said sensor prior to engine start according to a pregiven program, storing said detected value in said memory means as an initial value, reading the detected value of said sensor after engine start and correcting the detected value after engine start by said stored initial value, calculating a command value of ignition timing on the basis of said corrected detected value, and controlling the ignition timing on the basis of said command value.

7. An electronic ignition timing advancing apparatus according to claim 6, further comprising a second sensor for detecting the engine rotational speed, a third sensor for detecting the temperature of engine cooling water in a water jacket and a fourth sensor for detecting the temperature of engine suction air of a carburetor, said microprocessor reading the outputs of said second, third and fouth sensors after engine start, thereby calculating a command value of ignition timing on the basis of said corrected detected value and said outputs of said second to fourth sensors.

8. An ignition device according to claim 6, in which said microprocessor repeats, after engine start, said steps of reading said sensor detected value, correcting said value by said stored initial value, calculating a command value of ignition timing on the basis of said corrected detected value, and thus controlling the ignition timing on the basis of said command value.

9. An ignition device according to claim 6, in which said microprocessor produces said corrected detected value by subtracting said stored initial value from said detected value read after engine start.

10. An ignition device according to claim 6, in which said means affecting engine operation is a throttle valve, said state of said means is the throttle opening degree, and said first sensor is a potentiometer operatively interlocked with said throttle valve.

* * * * *